United States Patent [19]

Schalow et al.

[11] 3,976,985

[45] Aug. 24, 1976

[54] ALARM CIRCUIT SUITABLE FOR MONITORING FREEZER TEMPERATURE

[75] Inventors: Rudolph D. Schalow; John T. Link, both of Fort Wayne, Ind.

[73] Assignee: Energystics Corporation, Fort Wayne, Ind.

[22] Filed: Apr. 17, 1975

[21] Appl. No.: 568,845

[52] U.S. Cl. .................. 340/228 R; 340/227 R; 307/310; 73/362 AR
[51] Int. Cl.² ............................................. G08B 21/00
[58] Field of Search .......... 340/228 R, 227 R, 333, 340/420; 307/308, 310; 73/339 R, 362 R, 362 AR, 362 SC

[56] References Cited
UNITED STATES PATENTS

| | | | |
|---|---|---|---|
| 3,569,964 | 3/1971 | Mande | 340/333 |
| 3,636,540 | 1/1972 | Harris | 340/228 R |
| 3,753,259 | 8/1973 | Donovan | 340/228 R |
| 3,813,551 | 5/1974 | Broadbent | 340/228 R |

*Primary Examiner*—John W. Caldwell
*Assistant Examiner*—William M. Wannisky
*Attorney, Agent, or Firm*—Lundy & Welch

[57] ABSTRACT

A solid state electronic alarm circuit including means for sensing a predetermined change in a parameter such as the temperature in a freezer or the like from a predetermined safe limit and means for generating an audible alarm in response thereto.

1 Claim, 1 Drawing Figure

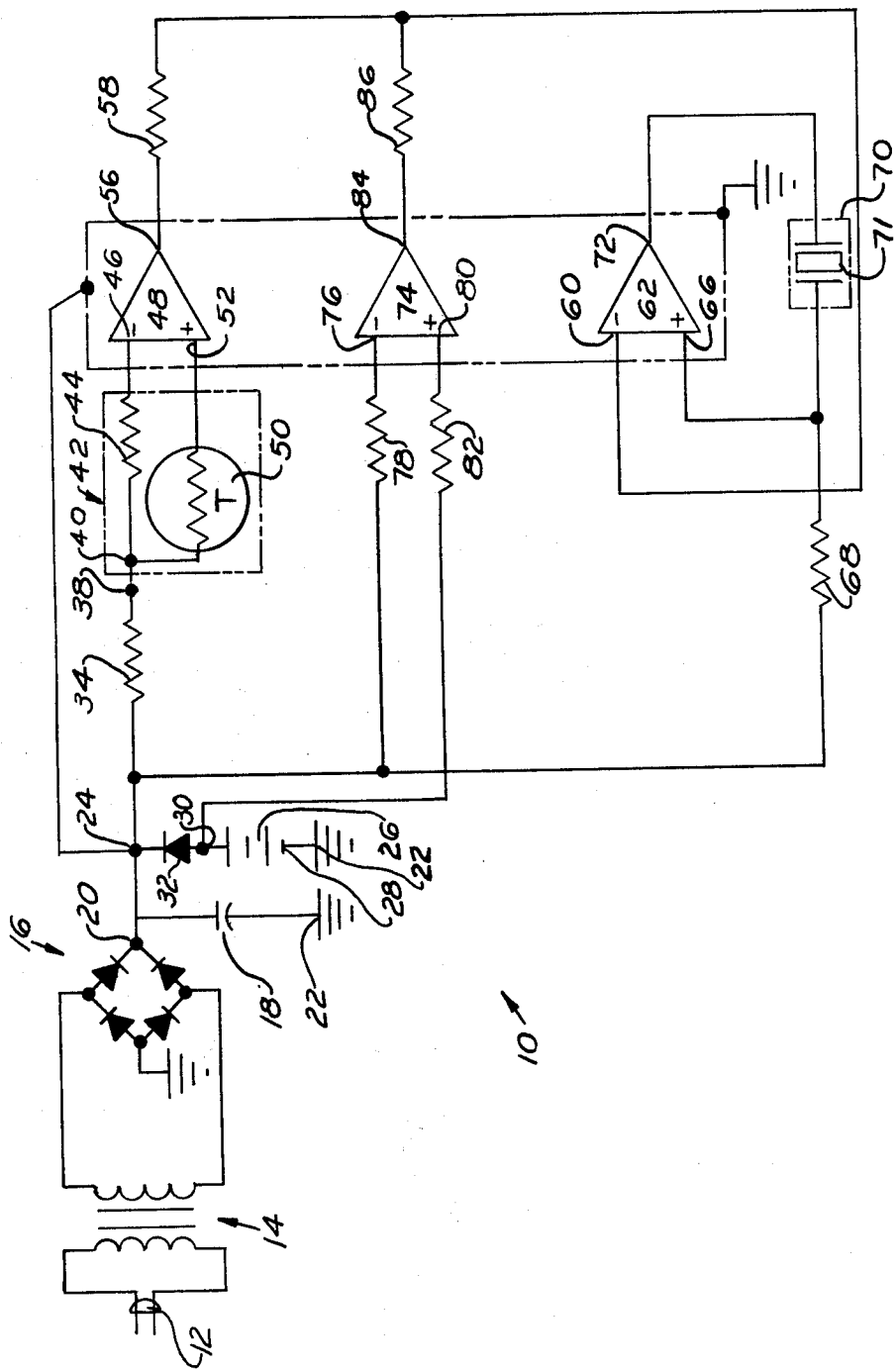

ALARM CIRCUIT SUITABLE FOR MONITORING FREEZER TEMPERATURE

BACKGROUND OF THE INVENTION

1. Field of the Invention

The present invention relates to alarm devices and in particular to such a device for sensing a change in a given parameter such as the temperature in a freezer, freezer compartment or the like from a predetermined safe level and for providing an alarm signal indicative thereof.

2. Description of the Prior Art

Numerous applications of alarm circuits exist. For example, among the many appliances that have received wide acceptance in the home, one of the most common and important appliances is the home freezer or combination refrigerator-freezer. Such freezers enable a household to purchase significant quantities of foods in bulk quantities to take advantage of special sales and similar cost and convenience buying practices. Accordingly, it is not at all uncommon for the owner of a freezer to have stored therein a quantity of food representing a substantial financial investment.

Frequently, the freezer, refrigerator or the like used to store food for a long period of time is situated remote from the kitchen or other high traffic areas of a home, such as for example in a garage or basement. In the event of a power failure or mechanical breakdown of the freezer, it is important that the owner take prompt steps to prevent the freezer interior from rising above a predetermined safe temperature which may result in loss of some or all of the foods stored therein. In the event of a power failure, the owner of a freezer is of course aware of the situation. However, it is not uncommon for the owner of a freezer to forget that the freezer is inoperative during these periods and losses of frozen foods often results. In the event of a mechanical failure of the freezer itself, the owner is frequently totally unaware of the situation until he opens same and finds that the contents have thawed and/or spoiled. In a similar manner, sensing a change in temperature near a ceiling can be utilized for a fire alarm. Substituting a door or window switch, or a pressure sensitive switch for the temperature sensor enables use of an alarm circuit as a burglar alarm or a pump failure alarm.

There is therefore a need for a simple, easily mounted device which is inexpensive and can be easily adapted to provide an audible or other alarm indicative that a predetermined parameter has changed or shifted from a safe limit.

SUMMARY OF THE INVENTION

Broadly, the present invention is an alarm device which includes means for sensing that a predetermined parameter such as the temperature within a freezing compartment has changed from a safe or normal limit and means for generating an audible or other alarm signal indicative of that condition.

It is therefore an object of the invention to provide an alarm device for providing a warning signal that a predetermined parameter is changing toward an unsafe level.

It is another object of the invention to provide such an alarm which is simple in construction and is easily installed without modification of existing equipment.

Yet another object of the invention is to provide an alarm which will warn the owner thereof of a defect, a power failure, or removal of the power to a device, or other failures or breaches at a time which enables the owner to take remedial steps.

Still another object of the invention is to provide such an alarm which includes an auxilary self-contained power supply whereby the alarm will operate irrespective of the presence or absence of power.

Another object of the invention is to provide such an alarm which will provide an indication of a failure even after a defect such as a power failure has occured in the event that such a defect is not immediately discovered.

It is another object of the invention to provide such an alarm which will provide a warning of a failure in advance of any loss to the contents thereof.

BRIEF DESCRIPTION OF THE DRAWING

The above mentioned and other features and objects of this invention and the manner of attaining them will become more apparent and the invention itself will be best understood by reference to the following description of an embodiment of the invention taken in conjunction with the accompanying drawing of an electrical schematic of an alarm circuit in accordance with the present invention.

DESCRIPTION OF A SPECIFIC EMBODIMENT

Referring now to the drawing, there is shown an alarm circuit 10 used in this instance as a freezer alarm. Power for the circuit 10 is normally provided from a conventional 115 volt AC power source by a plug 12. The 115 volt AC power is applied to a voltage step-down transformer 14. The alternating voltage output of transformer 14 is rectified by means of bridge 16 and applied across a capacitor 18 connected between the output terminal 20 of bridge 16 and ground or reference terminal 22. Together, bridge 16 and capacitor 18 rectify and filter the output voltage of transformer 14 to generate a direct current supply voltage of about 12.0 volts DC, this voltage appearing at output terminal 24.

A standby power source is provided by a conventional 9 volt battery 26 having its negative terminal 28 coupled to ground 22 and its positive terminal 30 connected through a second diode 32 to output terminal 24. When the 115 volt AC source is operating, diode 32 is reverse biased thereby effectively removing battery 26 from the circuit. In the event of a power failure, the 115 volt AC source becomes inoperative and a slightly lower direct current voltage (about 9 volts DC in an operating embodiment of the invention) is supplied to terminal 24 from the battery 26. Resistor 34 is connected electrically in series between output terminal 24 and input terminal 40 of temperature sensing circuit 42.

Circuit 42 includes a first fixed resistor 44 connected electrically in series between terminal 40 and the negative or reference input terminal 46 of an amplifier circuit 48. A temperature variable resistor such as a thermistor 50 is connected electrically in series between terminal 40 and the positive or signal input terminal 52 of circuit 48.

Circuit 48 is a conventional solid state micro circuit such as a National LM3900 and configured as above described functions as a current comparator or differential current amplifier. The values of resistor 44 and thermistor 50 are selected such that the currents applied therethrough to terminals 46, 52 of circuit 48 cause the circuit 48 to generate essentially a zero or "off" output signal at its output signal terminal 56 when the temperature of thermistor 50 is at a safe operating temperature for a freezer. In normal applications this is a temperature of about 14°F or less. When the temperature of thermistor 50 rises to an unsafe or "danger" temperature of about 15°F, the currents passing through resistor 44 and thermistor 50 causes circuit 48 to switch or trigger from its "off" condition to an "on" condition whereby it generates a positive output voltage at its terminal 56.

It should be observed that the selected temperature of 15°F is selected to be indicative that the freezer in which thermistor 50 is mounted is above a normal operating temperature but is still at a temperature at which damage or loss of food stuff stored therein has not yet occured. Further, this temperature allows for freezer temperature variations occasioned by normal opening and closing thereof for access.

The output signal appearing at terminal 56 is applied through a resistor 58 to negative input terminal 60 of a second amplifier circuit 62.

Connected electrically in series between supply terminal 24 and the positive input terminal 66 of circuit 62 is a resistor 68. An alarm device 70, preferably a solid state ceramic buzzer with a self contained crystal 71 but which may also be an electro-mechanical buzzer, a simple incandescent lamp or the like which includes a suitable oscillating element, is connected between output terminal 72 of circuit 62 and input terminal 66 thereof.

A third amplifier circuit 74 has its negative input terminal 76 connected to terminal 24 through a resistor 78. The positive or signal terminal 80 of amplifier 74 is connected through another resistor 82 to the positive terminal 30 of battery 26. The output terminal 84 of circuit 74 is connected through a resistor 86 to the negative terminal 60 of circuit 72.

The three amplifier circuits 48, 62, and 74 are, in a working embodiment of the invention, all included in a single LM3900 micro circuit package.

In operation, when the temperature within the freezing compartment rises to the predetermined temperature limit, i.e., 15°F, the resistance of thermistor 50 drops. When it reaches a predetermined value, the output of circuit 48 shifts from a substantially zero voltage level to a positive voltage. This in turn causes circuit 62 in conjunction with device 70 to oscillate causing device 70 to emit a steady audible alarm. The alarm will continue to sound until the temperature within the freezer compartment drops below the "safe" 15°F level.

In some circumstances, it may be desirable to have the circuit 62 latch into a conductive state when the temperature within the freezing compartment has risen above the "safe" temperature limit. Such a circuit may, for example, be desirable when the freezer is situated at a vacation cabin or the like that is only visited periodically. Under such conditions, it is possible that a power failure could occur allowing the temperature within the freezer to rise above the "safe" temperature for a period sufficient to cause the contents of the freezer to become spoiled. Subsequently, when power is restored, the freezer would cool, the contents thereof would become refrozen, and the owner would be totally unaware of the condition of the food therein.

Such an alternative embodiment can be effected by simply adding a latching circuit (not shown) responsive to the output of circuit 48. In this embodiment, once the latch circuit (not shown) is triggered to a conductive state it will remain conductive until the power within the battery 26 drains below an operating level or the circuit is reset.

It has been assumed that the circuit 10 has been continuously plugged into a suitable source of alternating current potential. Under these circumstances, the current through resistor 78 into negative terminal 76 of circuit 74 is greater than the current into the positive terminal 80 thereof. Under these conditions, the output of circuit 74 is at a 0 or low level. However, if plug 12 is unplugged, the voltage at terminal 30 of battery 26 will be higher than the voltage at terminal 24 since there will be no output voltage from bridge 16 and because of the voltage drop across diode 32 between battery terminal 30 and terminal 24. This causes circuit 74 to shift from a low or "off" condition to a high or "on" condition. This voltage shift is supplied by a resistor 86 to the negative input terminal 60 of circuit 62 again causing same to ascillate, whereby device 70 emits an audible alarm. This condition will continue only for so long as the plug 12 is disconnected.

It will further be observed that the frequency of oscillation of circuit 62 is determined by the crystal 71 or other oscillatory element within device 70. The frequency of oscillation is therefore totally independant of the specific output voltages or signals from circuit 48 and/or circuit 74.

The only portion of the circuit that must be mounted physically within the freezer compartment is the thermistor 50 and this can be effected by passing two relatively small wires into the freezer compartment. By limiting the size of these conductors, it is not necessary to drill or otherwise modify the freezer compartment, the conductors rather passing over the sealing strip of the compartment.

In a working embodiment of the invention, the following circuit parameters were used:

| | |
|---|---|
| Resistor 34 | 1 Megohm |
| Resistor 44 | 18 K ohms |
| Resistors 58, 86 | 200 K ohms |
| Diodes 16, 32 | 1N4001 |
| Thermistor 50 | KA34J1 |
| Resistor 68 | 330 K ohms |
| Resistor 78 | 1 Megohm |
| Resistor 82 | 910 K ohms |
| Circuits 48 | National LM3900 |
| Transformer 14 | voltage step-down transformer, 115 volts AC input, 12.0 volts AC output |
| Capacitor 18 | 25 microfarads |
| Power Consumption | 6.6 milliamps with temperature below 15°F, 10 milliamps with temperature above 15°F |

From the above description it will be seen that the present invention provides a simple, reliable, and relatively inexpensive warning device which can be easily installed on existing freezers or refrigerators or the like. The circuit provides a positive alarm to warn the owner that the temperature within the freezer has risen above its normal operating temperature or that the freezer etc. has been unplugged and provides this warning before the contents of the freezer are damaged. This enables the owner of the freezer to either have the appliance repaired or to take other remedial steps to remove the contents thereof for safe storage elsewhere.

In the above description, the alarm circuit of the present invention has been described in conjunction with a freezer, refrigerator or the like for providing an indication that the temperature therein has risen above a predetermined safe level. It will, however, be observed that operationally the circuit responds to a differential current applied to the inputs of the amplifier 48. The differential current results from an imbalance between the resistance of the resistor 44 and thermistor 50. In view of the above description it will be apparent to those skilled in the art that the values of resistor 44 and thermistor 50 can be altered. Similarly, different thermistors can be substituted whereby the circuit will respond to different temperature ranges and temperature differentials. Alternatively, the thermistor 50 can be replaced with other variable resistance elements or, for that matter, with a switch which exhibits different resistance values depending upon whether it is open or closed. The variable resistance can also be provided by such devices as strain gauges whereby the alarm circuit can be utilized to sense pressure and numerous other parameters. In each instance, a proper balancing between the resistor 44 and the sensing device is all that is required to adapt the circuit to generate an alarm signal in response to a predetermined change in the parameter value.

The circuit is also responsive to the loss or failure of a power supply. In this application, the alarm circuit can similarly be applied to numerous uses wherein it is desired to generate an alarm signal in response to a power failure or loss of power to any device. Such applications may include a sump pump, air conditioning unit and many other commercial, private, and industrial uses.

While there have been described above the principles of this invention in connection with specific apparatus, it is to be clearly understood that this description is made only by way of example and not as a limitation to the scope of the invention.

What is claimed is:

1. An Alarm Circuit comprising first control signal generating means for sensing a predetermined parameter and generating a first control signal variable between first and second states in response to a predetermined change therein, alarm signal generating means connected to said control signal generating means to receive said control signal and operable between idle and active states in response thereto, alarm means coupled to said alarm signal generating means for generating an audible alarm in response to said active state of said alarm signal generating means, power supply means including means for connecting same to a source of alternating current potential and a battery for supplying operating power to said circuit, means responsive to the absence of said alternating current potential for generating a second control signal variable between first and second states in response thereto, said alarm means being connected to said second control signal generating means and being operable between said idle and active states in response to said first and second states thereof, said second control signal generating means including a differencial current amplifier having an input terminal connected directly to said battery and a second input terminal connected to said battery through a diode, the voltage at said second terminal being greater than the voltage at said first terminal in the presence of said alternating current potential, the voltage at said first terminal being greater than the voltage at said second terminal in the absence of said alternating current potential, said second control signal generating means being operative into said active state when said voltage at said first terminal is greater than the voltage at said second terminal.

* * * * *